United States Patent [19]

St. Laurent, Jr.

[11] 4,208,060
[45] Jun. 17, 1980

[54] SEALED SHAFT

[75] Inventor: Wilfred H. St. Laurent, Jr., Marblehead, Mass.

[73] Assignee: Bellofram Corporation, Burlington, Mass.

[21] Appl. No.: 3,163

[22] Filed: Jan. 15, 1979

[51] Int. Cl.² .............................................. F16J 15/56
[52] U.S. Cl. ................................ 277/212 FB; 74/18.2
[58] Field of Search ......... 277/212 R, 212 FB, 212 C, 277/212 F; 74/18.2, 18

[56] References Cited

U.S. PATENT DOCUMENTS

| | | | |
|---|---|---|---|
| 963,060 | 7/1910 | Noppel | 277/212 C X |
| 1,151,227 | 8/1915 | Stokes | 277/212 X |
| 1,495,290 | 5/1924 | Epperson | 74/18.2 |
| 1,712,003 | 5/1929 | Hubbard | 277/212 R X |
| 2,136,835 | 11/1938 | Begg | 277/212 R X |
| 2,178,953 | 11/1939 | Chilton | 74/18.2 X |
| 3,171,285 | 3/1965 | Tuft | 74/18.2 |
| 3,391,646 | 7/1968 | Schlosser | 74/18.2 X |
| 3,460,650 | 8/1969 | Henry-Biofaud | 277/212 FB X |
| 3,528,301 | 9/1970 | Wasmer | 74/18.2 |
| 3,748,913 | 7/1973 | Quiney | 74/18.2 |

FOREIGN PATENT DOCUMENTS

| | | | |
|---|---|---|---|
| 1802780 | 9/1970 | Fed. Rep. of Germany | 74/18.2 |
| 2333432 | 1/1974 | Fed. Rep. of Germany | 277/212 FB |

*Primary Examiner*—Robert S. Ward, Jr.
*Attorney, Agent, or Firm*—Erwin Salzer

[57] ABSTRACT

A shaft sealing precluding fluid from moving in a direction longitudinally of the shaft. At the same time the shaft sealing allows a motion of the shaft in axial direction, an inclination of the shaft, and may also allow a rotary motion of the shaft relative to its sealing means. The sealing means is a rolling diaphragm including a clamping flange on one end of the rolling wall thereof. The other end of the rolling diaphragm is provided with a cylindrical elastomeric member having a projection conforming substantially with the shape of a portion of reduced diameter of the shaft and engaging under pressure said portion of reduced diameter.

6 Claims, 6 Drawing Figures

SEALED SHAFT

BACKGROUND OF THE INVENTION

This invention provides a shaft seal which is less complex and less expensive than prior art shaft seals.

SUMMARY OF THE INVENTION

A sealed shaft according to the present invention has one or more than one circular grooves having a smaller inner diameter than the outer diameter of said shaft. The groove or grooves are bounded in axial direction by two shaft portions of relatively larger diameter. The groove or grooves have a predetermined length and the bottom thereof forms one or more cylindrical surfaces of invariable diameter. The sealed shaft further includes a rolling diaphragm having a rolling wall and attachment means on both ends of said rolling wall. The radially outer of said attachment means includes a clamping flange, and means for exerting pressure against said clamping flange. The radially inner of said attachment means includes an elastomeric tubular extension having substantially the same length as said groove, conforming to the shape of said groove, engaging said groove, and having a radially outer diameter exceeding the outer diameter of said shaft adjacent said extension. The rolling wall of said rolling diaphragm further includes a portion immediately adjacent said groove or grooves which has an inner diameter equal to the outer diameter of said shaft when the latter is not inclined. Said portion of said diaphragm tightly engages said shaft in the non-inclined position thereof. The shaft is allowed to be more or less inclined.

DESCRIPTION OF PREFERRED EMBODIMENTS

Figure 1:
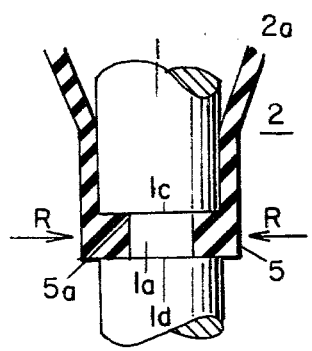
FIG. 1 shows in longitudinal section means for affixing the axially inner end of a rolling diaphragm to a rotatable shaft.
Figure 2:
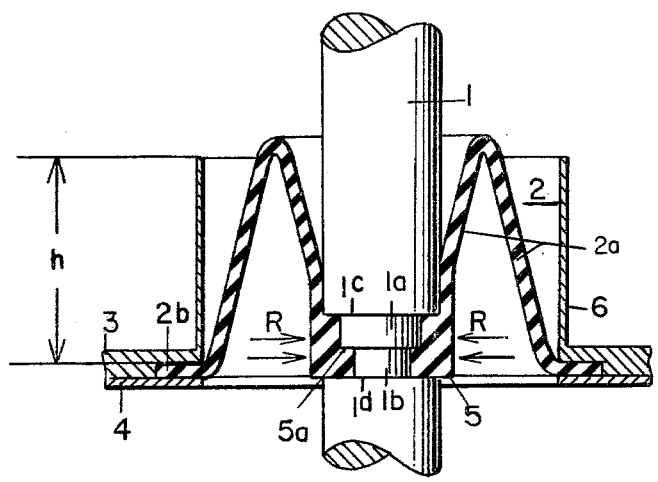
FIG. 2 shows the preferred embodiment of the invention and is a longitudinal section of a complete assembly according to this invention in a position close to one of the physical limit positions thereof.
Figure 4:
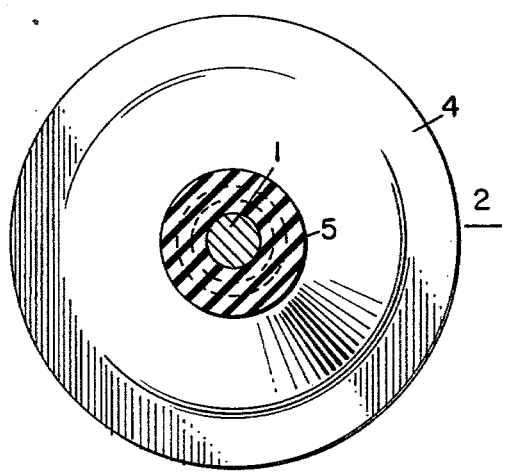
FIG. 4 is a section along 4—4 of FIG. 3.

Referring now to the drawings, numeral 1 has been applied to indicate a shaft which may be rotatable or non-rotatable. As shown in FIG. 1, shaft 1 is provided with a groove 1a and as shown in FIG. 2 shaft 1 has a first annular portion 1a of relatively large outer diameter and a second coaxial annular portion 1b of relatively small diameter. Said first recess or groove 1a and said second recess or groove 1b form an integral cavity 1a,1b in shaft 1. As shown in FIG. 1, groove 1a in shaft 1 is bounded by two portions 1c,1d of relatively larger diameter than portion 1a of shaft 1. In the embodiment of FIG. 2 the shaft portions 1a,1b which form a graded groove in shaft 1 are bounded by planar surfaces 1c,1d having a larger diameter than either of shaft portions 1a,1b. Numeral 2 has been applied to generally designate a rolling diaphragm including a rolling wall 2a and means for attaching both ends of said rolling wall. One of said attachment means, namely that for the radially outer end of its rolling wall 2a, includes a clamping flange 2b clamped between parts 3 and 4. The other attachment means, namely that for the radially inner end of rolling diaphragm 2, includes a substantially cylindrical member 5 of an elastomeric material arranged in coaxial relation to shaft 1 and surrounding shaft 1. As shown in FIG. 1, member 5 has an annular projection 5a conforming substantially to the shape of the portion of reduced diameter 1a of shaft 1 and engaging said portion of reduced diameter. This gives rise to strong forces in the direction of arrows R causing rolling diaphragm 2 to adhere to shaft 1. The structure of FIGS. 2 to 4 has a tendency to increase these forces as indicated by arrows R by virtue of the increased length and the grading of elastomeric portion 5. The circular groove 1a of FIG. 1 and the circular grooves 1a,1b of FIG. 2 have a predetermined length in a direction longitudinally of shaft 1, and the bottom of said groove or grooves forms one or more cylindrical surfaces of invariable diameter. In other words, the portions of shaft 1 between surfaces 1c,1d are of a constant diameter, or diameters, rather then being curved in longitudinal section. The projection 5a conforms substantially to the shape of the groove or cavity into which it enters and engages the shaft, i.e. projection 5a has the same length and conforms to the shape of groove 1a, or grooves 1a,1b. The radially outer diameter of projection 5a exceeds the diameter of shaft 1 adjacent to the groove or grooves by which it is received. This has been clearly shown in FIGS. 1,2 and 3. It will also be apparent from FIGS. 1,2 and 3 that the rolling wall 2a of rolling diaphragm 2 immediately adjacent tubular projection 5a includes a portion having an inner diameter substantially equal to the outer diameter of shaft 1 which engages shaft 1 and clamps a portion of rolling wall 2a against shaft 1. This applies to the non-inclined position of shaft 1 and increases the forces by which the radially inner portion of diaphragm 2 is affixed to shaft 1.

Figure 3:
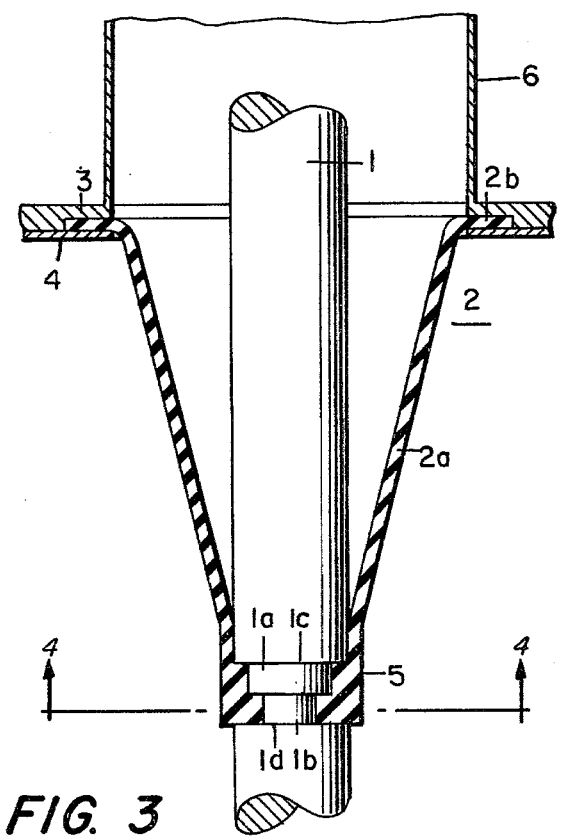
FIG. 3 shows the structure shown in FIG. 2 in the same fashion as FIG. 2 in a position close to the other physical limit position thereof.

It will be apparent from FIGS. 2 and 3 that shaft 1 is allowed by rolling diaphragm to move forewardly and rearwardly in axial direction. Rolling diaphragm 1 allows also small inclinations of shaft 1. If the elastic member 5 exerts relatively little pressure upon shaft 1 member 5 forms a bearing for shaft 1 allowing a relative rotary motion between shaft 1 and elastomeric member 5.

Elastomeric member 5 and rolling diaphragm 2 including its rolling wall 2a and its radially outer clamping flange 2b may consist of a unitary piece of an elastomeric material.

In the structure shown in FIGS. 2 and 3, rolling diaphragm 2 may have a tendency to balloon adjacent the radially outer clamping flange 2b thereof if a predetermined difference in pressure to opposite sides of rolling diaphragm 2 is exceeded. The term balloon as used in this context means to expand in a balloon-like fashion beyond acceptable limits. This is an undesirable condition. It can be prevented by providing the structure of FIGS. 2 and 3 with a stiff cylindrical wall 6 that limits the extent to which rolling wall 2a can balloon. Cylindrical wall 6 is arranged in coaxial relation to rolling wall 2a and supported adjacent the radially outer end of rolling wall 2. Cylindrical wall 6 may form an integral part of clamping member 3, as shown in FIGS. 2 and 3.

A cylindrical means for preventing ballooning of diaphragm 2 may also be used in connection with the embodiment of the invention shown in FIG. 1.

The height h of cylinder 6 may vary depending upon prevailing conditions. It may be much shorter than shown in FIGS. 2 and 3. FIGS. 2 and 3 show approximately the maximal height h that may be given to cylinder 6.

Figure 5A:
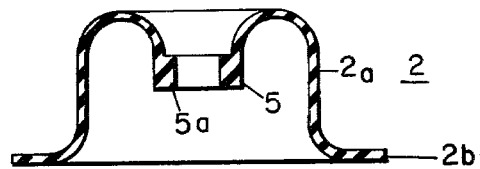
FIGS. 5a and 5b are diagrammatic representations of the structure according to this invention intended to show the difference between physically possible and operational limit positions.
Figure 5B:
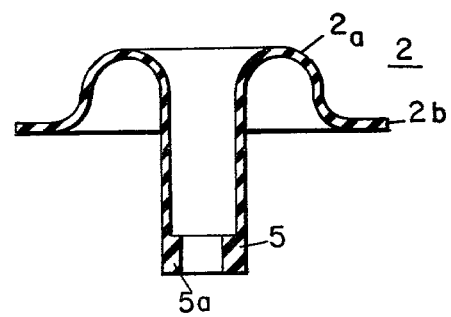

It was stated in describing the drawings that FIGS. 2 and 3 show an embodiment of the invention in positions close to one of the two physical limit positions thereof. FIGS. 2 and 3 show rolling diaphragm 2 in either of its physical or actually possible limit positions. It is not permissible to extend the rolling diaphragm 2 to the limit position shown in FIG. 3. The maximum operational upward stroke of shaft 1 is reached when the cross-section of the rolling wall 2a of the diaphragm 2 is substantially circular, as shown diagrammatically in FIG. 5a. In a similar way the maximum operational downward stroke of shaft 1 is reached when the cross-section of the rolling wall 2a of diaphragm 2 is substantially circular, as shown diagrammatically in FIG. 5b.

I claim as my invention:

1. A sealed shaft comprising in combination
   (a) a shaft having a pair of axially outer portions of relatively large outer diameter and a contiguous axially inner graded portion of relatively small diameter, said axially outer portions and said axially inner graded portion defining a graded integral cavity in said shaft,
   (b) a rolling diaphragm having a rolling wall and attachment means at both ends of said rolling wall;
   (c) one of said attachment means including a clamping flange for the radially outer end of said rolling wall; and
   (d) the other of said attachment means for the radially inner end of said rolling diaphragm including an elastomeric member arranged in coaxial relation to said shaft and surrounding said shaft and including an annular graded projection on said elastomeric member which conforms to the shape of said graded cavity in said shaft, engaging said graded cavity and exerting a radially inward pressure on said portion of relatively small diameter of said shaft.

2. A sealed shaft as specified in claim 1 wherein a stiff cylindrical wall surrounds said rolling wall of said rolling diaphragm, said stiff cylindrical wall being arranged in coaxial relation to said rolling wall and supported adjacent the radially outer end of said rolling wall to prevent ballooning of said rolling wall.

3. A sealed shaft comprising in combination
   (a) a shaft projecting from a space wherein relatively high pressure prevails into a space wherein relatively low pressure prevails;
   (b) said shaft having at least one circular groove on the side of said space wherein said relatively high pressure prevails, said groove defining at least one cylindrical portion of said shaft having a straight rather than a curved generatrix;
   (c) a rolling diaphragm having a rolling wall and attachment means at both ends of said rolling wall;
   (d) the radially outer of said attachment means including a clamping flange and means for applying clamping pressure against said flange;
   (e) the radially inner of said attachment means including means for fixedly attaching the radially inner end of said diaphragm to said shaft, namely a tubular elastomeric projection of the rolling wall of said diaphragm arranged in coaxial relation to said shaft and surrounding said shaft at the point thereof where said groove is located, said projection being substantially of the same length as said groove, having a larger thickness than the rolling wall of said rolling diaphragm and engaging said groove under radially inward pressure; and
   (f) said rolling wall immediately adjacent said projection engaging a portion of said shaft in the non-tilted position thereof and thereby adding to the forces maintaining said elastomeric projection inside said groove.

4. A sealed shaft comprising a combination of
   (a) a shaft having a circular groove of smaller diameter than the outer diameter of said shaft and being bounded in axial direction by two planar shaft portions of relatively larger diameter, the bottom of said groove having a predetermined length and defining along said predetermined length at least one cylindrical surface of unchangeable diameter;
   (b) a rolling diaphragm having a rolling wall and attachment means on both ends of said rolling wall;
   (c) the radially outer of said attachment means including a clamping flange and means for exerting pressure against said clamping flange;
   (d) the radially inner of said attachment means including an elastomeric tubular projection having substantially the same length as said groove and a larger thickness which exceeds the thickness of the rolling wall of said diaphragm, said tubular projection conforming to the shape of said groove and exerting radially inward pressure on the portion of said shaft coextensive with said groove; and
   (e) said rolling wall of said rolling diaphragm including a portion immediately adjacent said tubular projection in physical engagement with said shaft when said shaft is in the non-inclined position thereof.

5. A sealed shaft comprising
   (a) a fixed structure separating a space wherein a relatively high pressure prevails from a space wherein a relatively low pressure prevails;
   (b) said fixed structure having an aperture through which a shaft projects from said space wherein said relatively high pressure prevails to the space where said relatively low pressure prevails;
   (c) means allowing said shaft to be tilted, said means including a rolling diaphragm having a radially outer periphery fixedly clamped to said fixed structure and a radially inner periphery fixedly clamped to said shaft;
   (d) said shaft having at least one coaxial circular groove of invariable diameter having a predetermined length; and
   (e) an elastomeric tubular extension of the radially inner periphery of said rolling diaphragm conforming to the shape of said groove and engaging said groove, the radially outer diameter of said extension exceeding the outer diameter of said shaft immediately adjacent to said extension.

6. A sealed shaft as specified in claim 5 wherein the rolling wall immediately adjacent said groove engages said shaft when said shaft is in non-tilted position.

* * * * *